US012779553B2

(12) United States Patent
Oka

(10) Patent No.: US 12,779,553 B2
(45) Date of Patent: Nov. 3, 2026

(54) CUTTING TOOL

(71) Applicant: HONDA MOTOR CO., LTD., Tokyo (JP)

(72) Inventor: Keiichiro Oka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 212 days.

(21) Appl. No.: 18/850,592

(22) PCT Filed: Mar. 30, 2022

(86) PCT No.: PCT/JP2022/016034
§ 371 (c)(1),
(2) Date: Sep. 25, 2024

(87) PCT Pub. No.: WO2023/188120
PCT Pub. Date: Oct. 5, 2023

(65) Prior Publication Data
US 2025/0214150 A1 Jul. 3, 2025

(51) Int. Cl.
*B23B 29/034* (2006.01)

(52) U.S. Cl.
CPC .................................. *B23B 29/034* (2013.01)

(58) Field of Classification Search
CPC .......... B23B 29/03; B23B 29/034; B23C 5/24
See application file for complete search history.

(56) References Cited

U.S. PATENT DOCUMENTS 4,398,854 A 8/1983 Pape et al.

FOREIGN PATENT DOCUMENTS

| | | |
|---|---|---|
| JP | 53-130691 | 10/1978 |
| JP | 56-082102 | 7/1981 |
| JP | 2006-247775 | 9/2006 |
| JP | 2007-253305 | 10/2007 |
| JP | 2010-099795 | 5/2010 |
| JP | 2011-194481 | 10/2011 |

OTHER PUBLICATIONS

International Search Report and Written Opinion for International Application No. PCT/JP2022/016034 mailed on Jun. 21, 2022, 8 pages.

*Primary Examiner* — Moshe Wilensky
(74) *Attorney, Agent, or Firm* — Amin, Turocy & Watson, LLP

(57) ABSTRACT

This cutting tool comprises a tool shaft, a blade implement, a position adjustment mechanism, and a pressing mechanism. The blade implement is disposed so as to be capable of moving into an insertion hole in the tool shaft. The position adjustment mechanism is capable of adjusting the position of the blade implement relative to the tool shaft. The pressing mechanism is attached to the tool shaft. The pressing mechanism presses a grinding relief part of the blade implement. The pressing mechanism biases the blade implement toward a base end. The pressing mechanism biases the blade implement toward an inner peripheral surface of the insertion hole.

7 Claims, 8 Drawing Sheets

CUTTING TOOL

TECHNICAL FIELD

The present invention relates to a cutting tool that is used in a cutting machine that carries out machining on a workpiece.

BACKGROUND ART

A cutting machine disclosed in JP 2007-253305 A includes a tool main body that is capable of rotating. An outer circumferential part of the tool main body is equipped with a plurality of mounting seats along a direction of rotation of the tool main body. Inserts and clamp members are installed in the plurality of mounting seats. The inserts are capable of moving along first and second mounting surfaces of the mounting seats. Cutting edge parts are provided on distal ends of the inserts. Distal ends of adjustment screws that are screw-engaged with the mounting seats are capable of abutting against rear ends of the inserts. The adjustment screws are disposed at an inclination with respect to the inserts.

The clamp members are fixed to the tool main body by fixing screws from outer sides in a radial direction. The inserts are clamped and fixed in the mounting seats by the clamp members.

At a time when a positional adjustment of the cutting edges is carried out, the fixing screws are loosened and the clamp members are inclined, and thereafter, the rear ends of the inserts are pressed by screwing in the adjustment screws. In accordance with this feature, the inserts move outwardly in the radial direction of the tool main body along the first and second mounting surfaces. Accompanying the movement of the inserts, the positions of the cutting edge parts are adjusted. In addition, by tightening the fixing screws again, the inserts are fixed to the tool main body.

SUMMARY OF THE INVENTION

The tool main body is rotated and cutting machining is carried out on the workpiece by the cutting edge parts of the inserts. At that time, a reaction force is applied to the inserts from the workpiece, due to contact between the cutting edge parts of the inserts and the workpiece. A frictional torque generated at a time when the fixing screws are finally tightened may cause a change in the posture of the clamping members and the inserts to occur. Consequently, when the distal ends of the inserts rise up, the inserts are pressed and moved in directions away from the first mounting surfaces or the second mounting surfaces due to a reaction force at the time of machining. A problem arises in that, due to the fact that the inserts move from their predetermined positions, the machining accuracy of the workpiece by the cutting edge parts is reduced. When the positional adjustment of the cutting edge parts is carried out, after the fixing screws have been loosened and the clamp members are inclined, it is necessary to cause the adjustment screws to be screw-rotated.

Further, when the adjustment screws are retracted, it may become impossible for the inserts to be retracted. For this reason, there is a need to accurately screw-rotate and adjust using the two fixing screws and adjustment screws without backtracking, and such an adjustment operation is complicated.

The present invention has the object of solving the aforementioned problem.

An aspect of the present invention is characterized by a cutting tool that is used in a cutting machine configured to machine a workpiece, the cutting tool comprising a shaft configured to be rotationally driven by a drive mechanism, a blade tool including a distal end portion on which a cutting edge part is formed, and a proximal end portion on an opposite side from the distal end portion, the blade tool being configured to be inserted into an insertion hole provided in the shaft in a manner so as to extend in a direction intersecting with an axial direction of the shaft, and the blade tool being movable in a hole axial direction of the insertion hole, wherein the cutting edge part is disposed to project outwardly in a radial direction from an outer circumferential surface of the shaft, a position adjustment mechanism installed on the shaft and configured to adjust a position in the hole axial direction of the blade tool with respect to the shaft, and a pressing mechanism installed on the shaft and configured to, by pressing a pressed portion disposed between the cutting edge part and the proximal end portion of the blade tool, bias the blade tool toward the proximal end portion and bias the blade tool toward an inner surface of the insertion hole.

According to the present invention, the following advantageous effects can be obtained.

More specifically, when the shaft rotates and machining is carried out on the workpiece by the blade tool, a reaction force from the workpiece is applied to the cutting edge part of the blade tool. At this time, the pressed portion of the blade tool is pressed by the pressing mechanism, and the blade tool is biased toward the proximal end portion of the blade tool, and together therewith, the blade tool is also biased toward the inner surface of the insertion hole. In accordance with this feature, the blade tool is firmly fixed to the shaft. Accordingly, when the reaction force from the workpiece is applied to the cutting edge part of the blade tool, the blade tool is prevented from rattling with respect to the shaft. By the position adjustment mechanism, it is possible to easily and highly accurately adjust the amount by which the cutting edge part of the blade tool projects outwardly in the radial direction or inwardly in the radial direction. After the positional adjustment of the cutting edge part has been carried out, since there is no need to tighten the fixing screw as in the conventional technology, a change in the posture of the blade tool does not occur.

As a result, machining of the workpiece can be carried out with high precision by the blade tool. By using a grinding flank surface of the cutting edge part as a pressed portion, and by a preload that biases the blade tool toward the proximal end being applied by the pressing mechanism to the pressed portion, the manufacturing cost can be reduced as compared to a case of newly forming a portion to be pressed by the pressing mechanism.

DETAILED DESCRIPTION OF THE INVENTION

Figure 1:
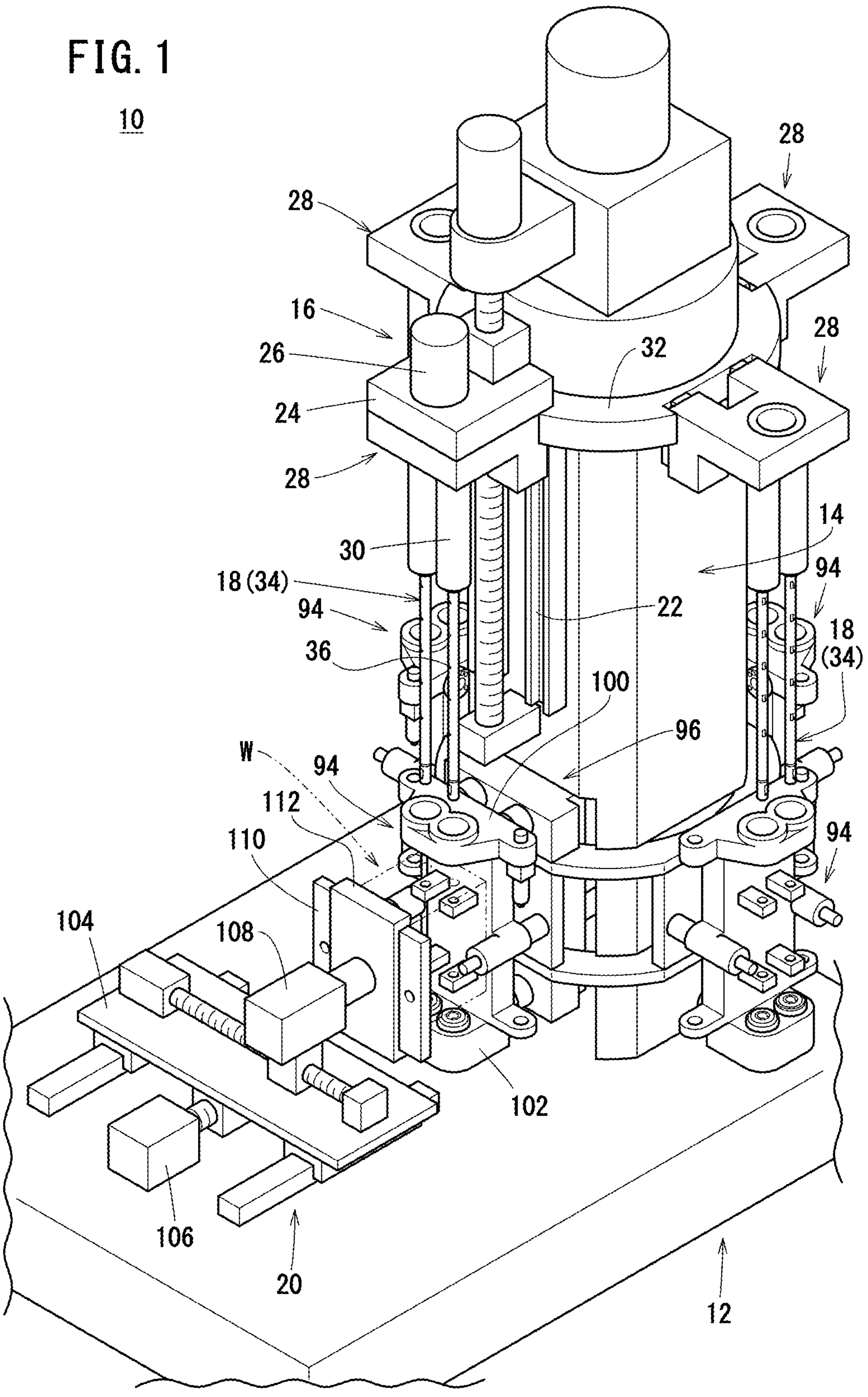
FIG. 1 is an external perspective view of a cutting machine in which a cutting tool according to an embodiment of the present invention is used.
Figure 2:
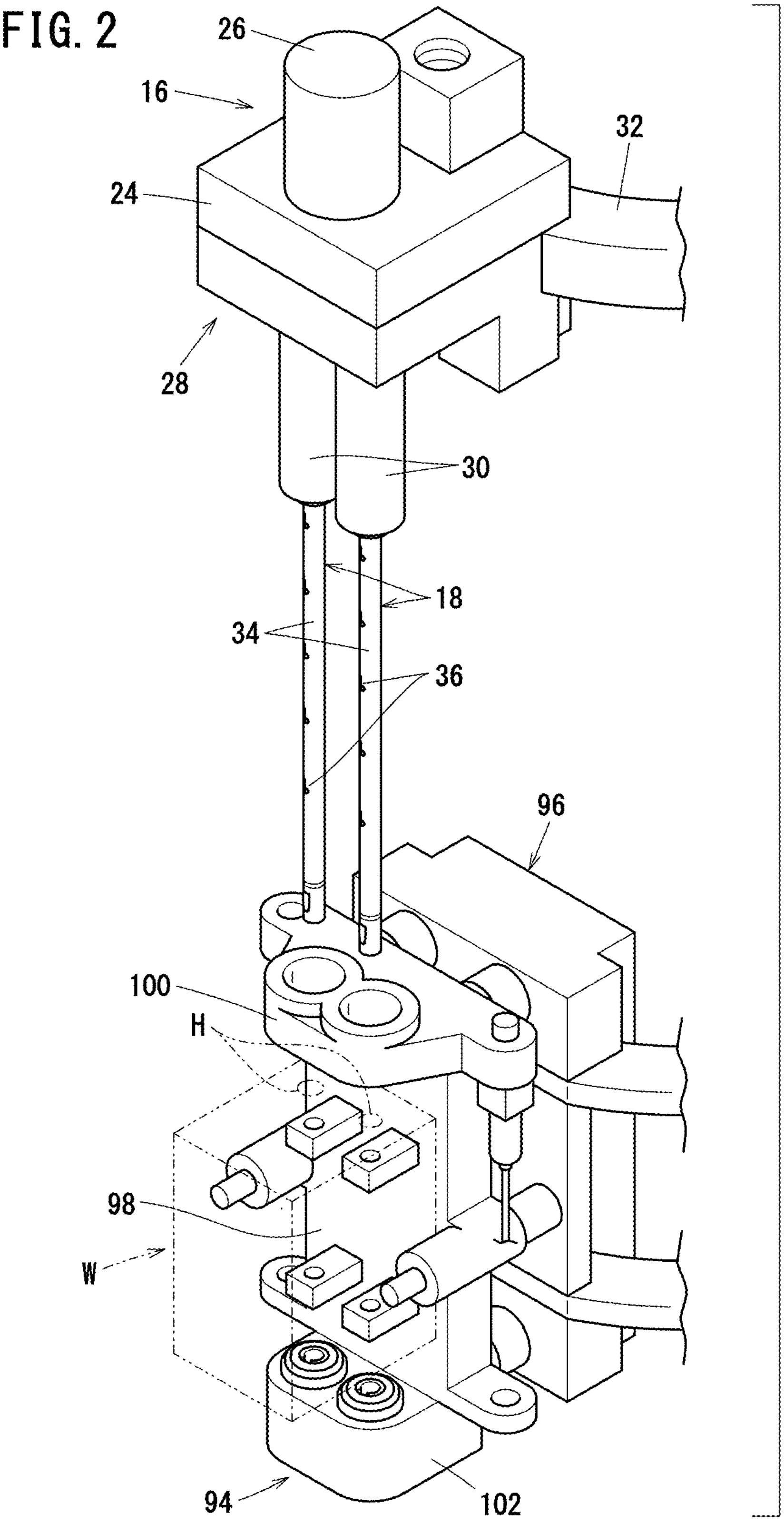
FIG. 2 is an enlarged perspective view of essential portions of the cutting machine shown in FIG. 1.
Figure 3:
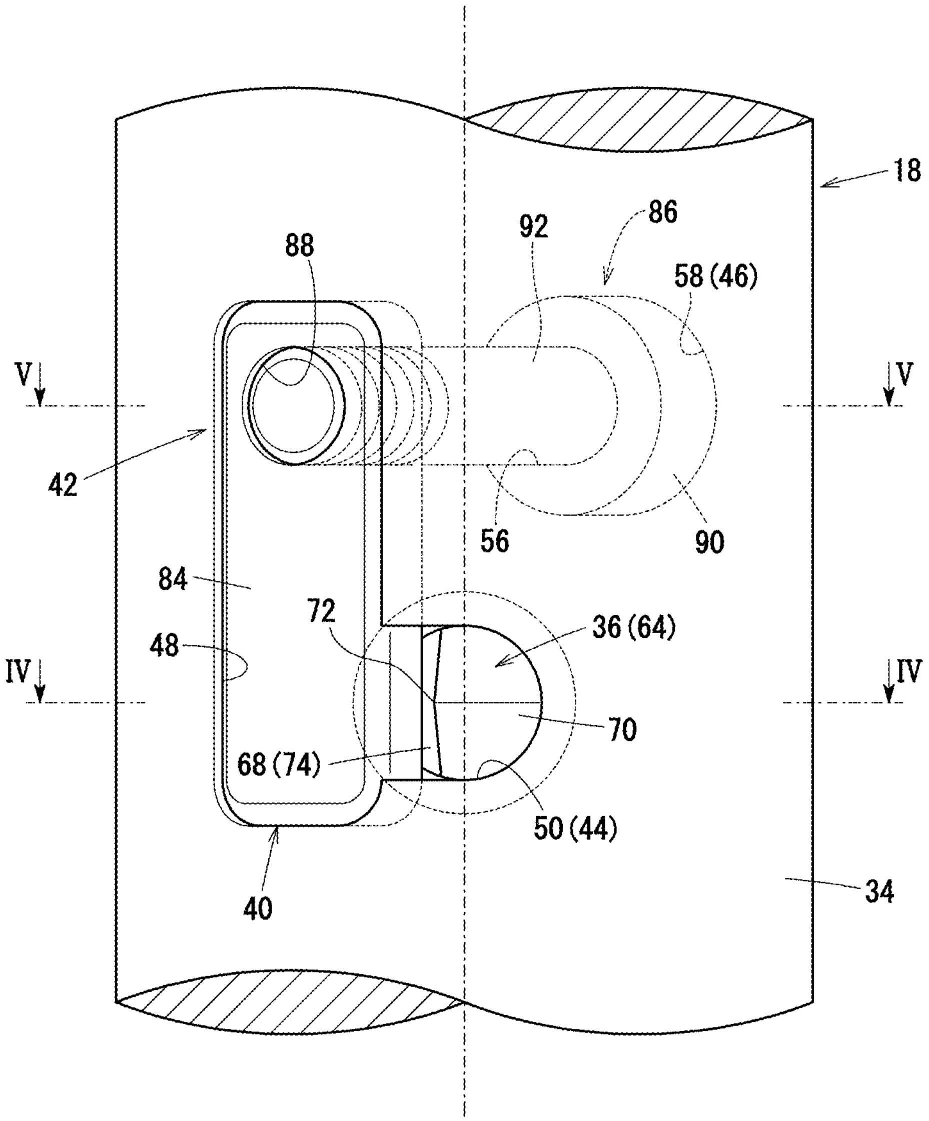
FIG. 3 is an enlarged front view showing a vicinity of the cutting tool in the cutting machine of FIG. 2.

A cutting machine 10 is used in order to carry out machining of holes in a workpiece W. The workpiece W is a cylinder of an internal combustion engine that is mounted in a vehicle. As shown in FIG. 1 and FIG. 2, the cutting machine 10 is equipped with a foundation 12, a main body frame 14, a drive mechanism 16, cutting tools 18, and a transport mechanism 20.

The foundation 12 is disposed in a lower part of the cutting machine 10. The foundation 12 is placed on a floor surface or the like.

The main body frame 14 stands upward from the foundation 12. The main body frame 14 is equipped with a guide rail 22. The guide rail 22 is disposed on the outer circumferential surface of the main body frame 14. The guide rail 22 extends along the axial direction of the main body frame 14.

The drive mechanism 16 is disposed on an upper part of the main body frame 14. The drive mechanism 16 is equipped with a lifting platform 24 and a drive motor 26. The lifting platform 24 is capable of moving in an upper/lower direction along the guide rail 22 of the main body frame 14. The drive motor 26 is fixed to an upper part of the lifting platform 24. The drive motor 26 includes drive shafts (not shown). The drive shaft passes through the lifting platform 24 and extends downwardly. Rotating shafts 30 of tool heads 28 are connected to lower ends of the drive shafts.

Four tool heads 28 are provided. The tool heads 28 are arranged on the outer circumference of the main body frame 14. The respective tool heads 28 are retained on a head carrier 32. The four tool heads 28 are spaced apart and arranged at equal intervals in the circumferential direction of the head carrier 32.

Each of the tool heads 28 is equipped with the rotating shafts 30. The rotating shafts 30 are supported to be capable of rotating on the tool heads 28. The rotating shafts 30 extend downwardly from the tool heads 28. Upper ends of the rotating shafts 30 are connected to the drive shafts (not shown) of the drive motor 26 in the drive mechanism 16. Lower ends of the rotating shafts 30 are connected to upper ends of tool shafts 34. By electrical power being applied to the drive motor 26, the rotating shafts 30 rotate together with the drive shafts.

As shown in FIGS. 3 to 6, cutting tools 18 are equipped with the tool shafts 34 (shafts), blade tools 36, position adjustment mechanisms 38, and pressing mechanisms 40.

As shown in FIG. 1 to FIG. 5, the tool shafts 34 are removably disposed in the tool heads 28. The tool shafts 34 are shaft bodies elongated along the axial direction. The cross-sectional shape of the tool shafts 34 is a circular shape. The tool shafts 34 extend with a constant diameter downwardly from the tool heads 28. Upper ends of the tool shafts 34 are capable of being connected to the lower ends of the rotating shafts 30. When the drive motor 26 rotates, the tool shafts 34 rotate together with the rotating shafts 30. Lower ends of the tool shafts 34 are capable of being inserted into bearings of second bearing portions 102 in later-described jigs 94. In the present embodiment, the tool shafts 34 are boring bars.

The tool shafts 34 are each equipped with a plurality of accommodating portions 42. The plurality of accommodating portions 42 are spaced apart from each other at substantially equal intervals along the axial direction of the tool shafts 34. The plurality of accommodating portions 42 are capable of accommodating the blade tools 36, the position adjustment mechanisms 38, and the pressing mechanisms 40.

The accommodating portions 42 are equipped with insertion holes 44, bolt holes 46, and concave portions 48.

The axial direction (hole axial direction) of the insertion holes 44 intersects with the axial direction of the tool shafts 34. In the present embodiment, the insertion holes 44 penetrate through the tool shafts 34 in a direction orthogonal to the axial direction thereof. The axial direction of the insertion holes 44 may also be inclined with respect to the axial direction of the tool shafts 34. The insertion holes 44 are formed in the shape of a straight line. The central axis of the insertion holes 44 passes through an axial line P of the tool shafts 34 (refer to FIG. 4). The insertion holes 44 include first hole portions 50 and second hole portions 52. The blade tools 36 of the cutting tools 18, which will be described later, are inserted into the insertion holes 44.

The first hole portions 50 are disposed from the center of the insertion holes 44 along the extending direction toward one ends of the insertion holes 44. The first hole portions 50 have a constant diameter along the axial direction of the insertion holes 44. The first hole portions 50 open on outer circumferential surfaces of the tool shafts 34.

The second hole portions 52 are disposed from the center of the insertion holes 44 along the extending direction toward the other ends of the insertion holes 44. The second hole portions 52 and the first hole portions 50 are connected in the vicinity of the center of the insertion holes 44 along the axial direction. The second hole portions 52 are larger in diameter than the first hole portions 50. The second hole portions 52 open on the outer circumferential surfaces of the tool shafts 34. Inner circumferential threaded portions 54 are included on the inner circumferential surfaces of the second hole portions 52. Adjustment members 76 of the position adjustment mechanisms 38, which will be described later, are screw-engaged with the second hole portions 52.

The bolt holes 46 penetrate through the tool shafts 34 in a direction orthogonal to the axial direction thereof. The bolt holes 46 and the insertion holes 44 are spaced apart from each other in the axial direction of the tool shafts 34. In the present embodiment, the bolt holes 46 are disposed above the insertion holes 44 (refer to FIG. 3). The central axis of the bolt holes 46 passes through the axial line P of the tool shafts 34. Fastening bolts 86 of the pressing mechanisms 40, which will be described later, are inserted into the bolt holes 46.

Figure 4:
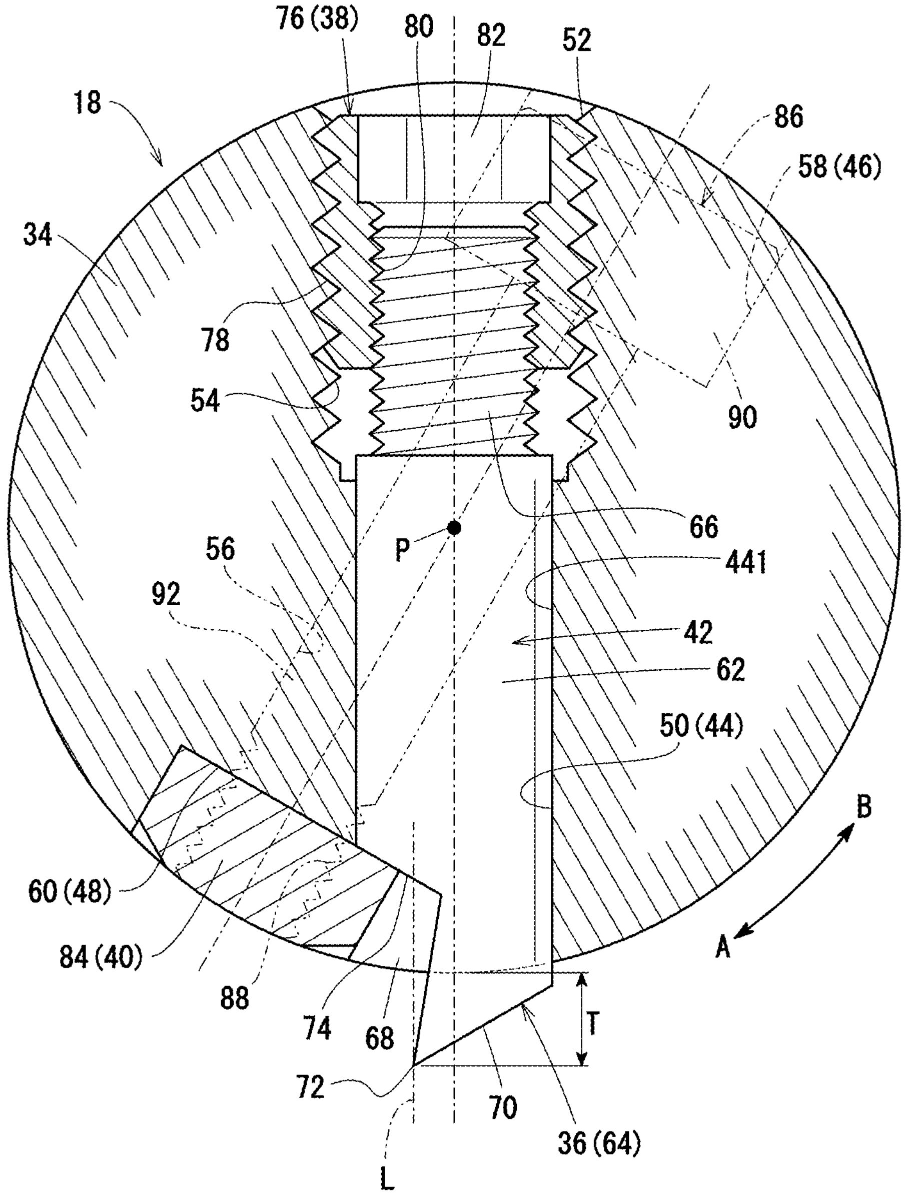
FIG. 4 is a cross-sectional view taken along line IV-IV of FIG. 3.
Figure 5:
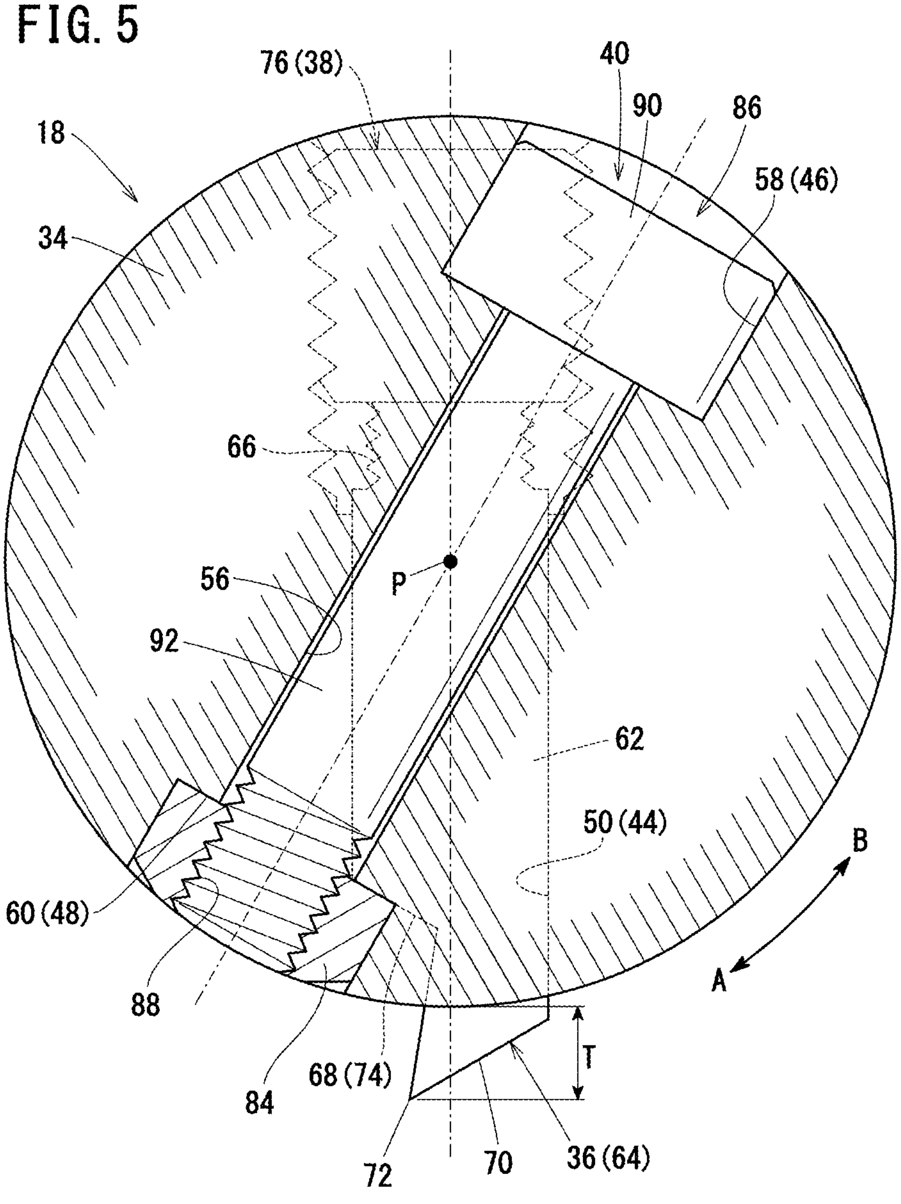
FIG. 5 is a cross-sectional view taken along line V-V of FIG. 3.
Figure 6:
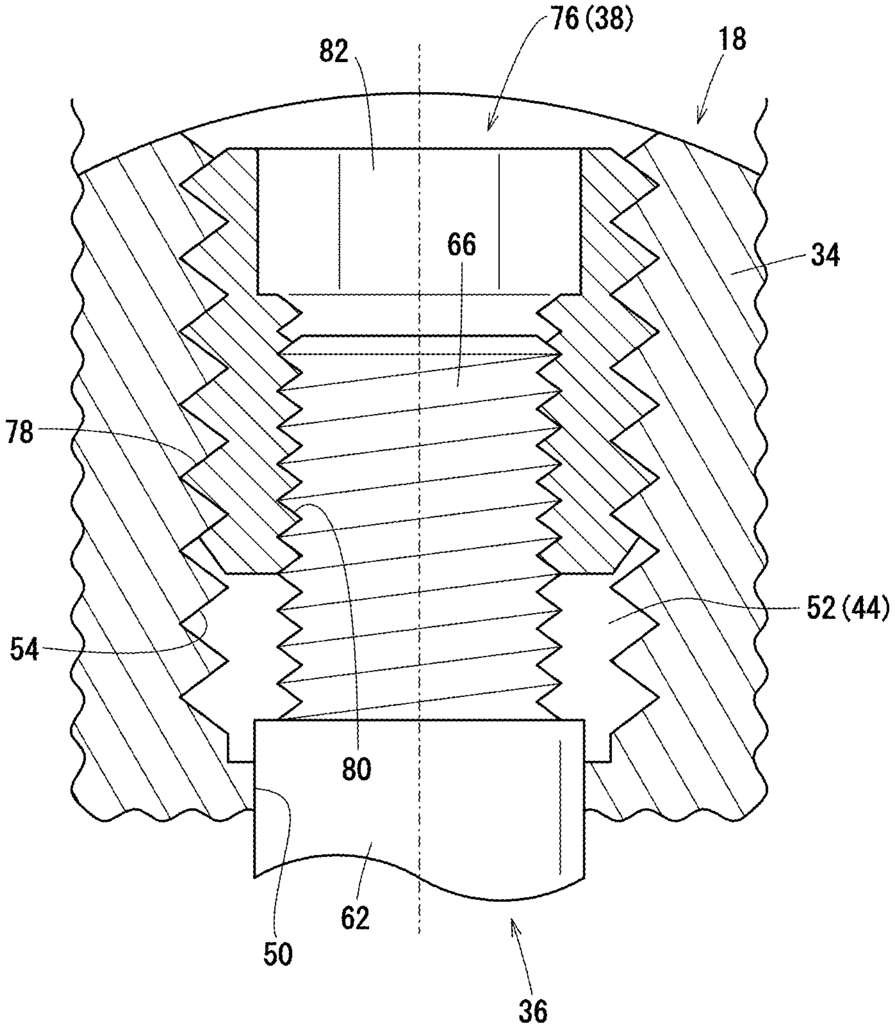
FIG. 6 is an enlarged cross-sectional view of a vicinity of an adjustment member shown in FIG. 4.

When viewed from the axial direction of the tool shafts 34 shown in FIG. 4, the central axis of the bolt holes 46 and the central axis of the insertion holes 44 intersect at a predetermined angle. The central axis of the bolt holes 46 and the central axis of the insertion holes 44 intersect at the axial line P of the tool shafts 34 (refer to FIG. 4 and FIG. 5). When viewed from the axial direction of the tool shafts 34 shown in FIG. 4, the bolt holes 46 are disposed at a predetermined angle of inclination with respect to the insertion holes 44 in the direction of rotation (the direction of the arrow A) of the tool shafts 34. When viewed from the axial direction of the tool shafts 34 shown in FIG. 4, the direction of rotation of the tool shafts 34 is a clockwise direction.

The bolt holes 46 include small diameter portions 56, and large diameter portions 58. The bolt holes 46 are formed in the shape of a straight line.

The small diameter portions 56 are disposed at one ends along the extending direction of the bolt holes 46. The small diameter portions 56 open on the outer circumferential surfaces of the tool shafts 34. The small diameter portions 56 have a constant diameter along the extending direction of the bolt holes 46. The small diameter portions 56 extend from one ends to the vicinity of the other ends along the extending direction of the bolt holes 46. When viewed from the axial direction of the tool shafts 34 shown in FIG. 4, the small diameter portions 56 open at positions toward the direction of rotation (the direction of the arrow A) of the tool shafts 34 with respect to the first hole portions 50 of the insertion holes 44.

The large diameter portions 58 are disposed at the other ends along the extending direction of the bolt holes 46. The large diameter portions 58 are larger in diameter than the small diameter portions 56. The large diameter portions 58 open on the outer circumferential surfaces of the tool shafts 34. In the vicinity of the other ends of the bolt holes 46, the large diameter portions 58 and the small diameter portions 56 are connected. When viewed from the axial direction of the tool shafts 34 shown in FIG. 4, the large diameter portions 58 open at positions toward the direction of rotation (the direction of the arrow A) of the tool shafts 34 with respect to the second hole portions 52 of the insertion holes 44.

The concave portions 48 are recessed inwardly in the radial direction from the outer circumferential surfaces of the tool shafts 34. When viewed from the axial direction of the tool shafts 34 shown in FIG. 4 and FIG. 5, the cross-sectional shape of the concave portions 48 is a substantially rectangular shape. The concave portions 48 have a rectangular shape elongated along the axial direction of the tool shafts 34. Upper parts of the concave portions 48 face toward the small diameter portions 56 of the bolt holes 46. Lower parts of the concave portions 48 face toward the first hole portions 50 of the insertion holes 44. The concave portions 48 are disposed in a manner so as to connect the small diameter portions 56 of the bolt holes 46 and the first hole portions 50 of the insertion holes 44.

The concave portions 48 include flat retaining surfaces 60. The retaining surfaces 60 are surfaces that are spaced apart from the outer circumferential surfaces of the tool shafts 34 inwardly in the radial direction. The retaining surfaces 60 extend along the axial direction of the tool shafts 34. At the upper parts of the concave portions 48, the small diameter portions 56 of the bolt holes 46 open at the center of the retaining surfaces 60. The central axes of the bolt holes 46 and the retaining surfaces 60 are orthogonal to each other (refer to FIG. 5).

At lower parts of the concave portions 48, a portion of the first hole portions 50 opens on the retaining surfaces 60. The concave portions 48 are disposed in an offset manner in the circumferential direction of the tool shafts 34 with respect to the central axis of the first hole portions 50. The concave portions 48 are disposed to be shifted from the central axis of the first hole portions 50 in the direction of rotation (the direction of the arrow A) of the tool shafts 34. The concave portions 48 and the insertion holes 44 communicate with each other.

The blade tools 36 include main body portions 62, cutting edge parts 64, threaded portions 66, and grinding relief portions (pressed portions) 68. The main body portions 62 are shaft bodies. The cross-sectional shape of the main body portions 62 is a circular shape. The diameters of the main body portions 62 are approximately the same as the diameters of the first hole portions 50 of the insertion holes 44. The main body portions 62 are inserted into the first hole portions 50.

The cutting edge parts 64 are disposed at distal end portions along the axial direction of the main body portions 62. The cutting edge parts 64 project out in a direction away from the main body portions 62. The cutting edge parts 64 project outwardly in the radial direction from the outer circumferential surfaces of the tool shafts 34.

The cutting edge parts 64 include cutting flank surfaces 70 and blade edges 72. The cutting flank surfaces 70 are inclined from the outer circumferential surfaces of the main body portions 62 toward the central axis of the blade tools 36. When viewed from the axial direction of the tool shafts 34 shown in FIG. 4, the cutting flank surfaces 70 are planar surfaces that extend from the outer circumferential surfaces of the main body portions 62 to a position beyond the central axis of the blade tools 36.

The blade edges 72 are provided at distal ends of the cutting flank surfaces 70. The blade edges 72 face in an inclined direction at a predetermined angle with respect to the central axis of the blade tools 36. When viewed from the axial direction of the tool shafts 34 shown in FIG. 4, the blade edges 72 have an acute angle. When the blade tools 36 are installed on the tool shafts 34, the blade edges 72 are disposed further in the direction of rotation (the direction of the arrow A) of the tool shafts 34 than the central axis of the blade tools 36. The blade edges 72 project out further in the direction of rotation (the direction of the arrow A) of the tool shafts 34 than the central axis of the blade tools 36.

By the tool shafts 34 being made to rotate, the inner circumferential surfaces of machined holes H (refer to FIG. 2) in the workpiece W are subjected to cutting machining by the cutting edge parts 64 of the blade tools 36.

The threaded portions 66 are disposed on proximal ends of the main body portions 62 along the axial direction of the main body portions 62. The threaded portions 66 extend in a direction away from the proximal ends of the main body portions 62. The threaded portions 66 include male threads. The threaded portions 66 are accommodated in the second hole portions 52 of the insertion holes 44.

Grinding relief portions 68 are disposed between the cutting edge parts 64 and the threaded portions 66 and adjacent to the cutting edge parts 64. The grinding relief portions 68 have a shape that is cut out from the distal ends of the blade tools 36 toward the main body portions 62. When viewed from the axial direction of the tool shafts 34 shown in FIG. 4, the grinding relief portions 68 are disposed in an opposite direction (the direction of the arrow A) to the cutting edge parts 64 with respect to the central axis of the main body portions 62. The grinding relief portions 68 include pressed surfaces (inclined surfaces) 74. The pressed surfaces 74 are inclined with respect to the central axis of the blade tools 36. The pressed surfaces 74 are grinding flank surfaces.

When the blade tools 36 are inserted into the insertion holes 44 of the tool shafts 34, the pressed surfaces 74 are orthogonal to the central axis of the bolt holes 46. The angle of inclination of the pressed surfaces 74 with respect to the central axis of the blade tools 36 is the same as the angle of inclination of the retaining surfaces 60 of the concave portions 48 with respect to the central axis of the insertion holes 44 (refer to FIG. 4). When the blade tools 36 are inserted into the insertion holes 44 of the tool shafts 34, the grinding relief portions 68 are disposed in the direction of rotation (the direction of the arrow A) of the tool shafts 34 with respect to the cutting edge parts 64.

The position adjustment mechanisms 38 are disposed in the second hole portions 52 of the insertion holes 44. The position adjustment mechanisms 38 are equipped with the adjustment members 76. The adjustment members 76 are cylindrically shaped. The adjustment members 76 are equipped with male threaded portions 78, female threaded portions 80, and adjustment hole portions 82.

The male threaded portions 78 are disposed on outer circumferential surfaces of the adjustment members 76. The thread pitch of the male threaded portions 78 is a first pitch. The male threaded portions 78 are screw-engaged with the inner circumferential threaded portions 54 of the second hole portions 52. The thread pitch of the male threaded portions 78 and the thread pitch of the inner circumferential threaded portions 54 are the same first pitch.

The female threaded portions 80 are disposed on inner circumferential surfaces of the adjustment members 76. The female threaded portions 80 penetrate through the adjustment members 76 in the axial direction. The thread pitch of the female threaded portions 80 is a second pitch. The female threaded portions 80 are screw-engaged with the threaded portions 66 of the blade tools 36. The thread pitch of the female threaded portions 80 and the thread pitch of the threaded portions 66 are the same second pitch. The second pitch of the female threaded portions 80 is smaller than the first pitch of the male threaded portions 78. The threaded portions 66 of the blade tools 36 are fixed by the adjustment members 76 to the second hole portions 52 of the insertion holes 44.

The adjustment hole portions 82 are disposed at the proximal ends of the adjustment members 76 and open thereon. The adjustment hole portions 82 penetrate through the female threaded portions 80. When viewed from the axial direction of the adjustment members 76, the adjustment hole portions 82 have a hexagonal shape. An adjustment tool (not shown) with a hexagonal distal end can be inserted into the adjustment hole portions 82, and thereby can rotate the adjustment members 76. By the adjustment members 76 being rotated, the adjustment members 76 are capable of moving along the central axis of the second hole portions 52. By the adjustment members 76 rotating, the blade tools 36 with the threaded portions 66 screw-engaged are capable of moving along the central axis of the insertion holes 44 together with the adjustment members 76. More specifically, the blade tools 36 are retained by the adjustment members 76 in a manner so as to be capable of moving in the axial direction of the insertion holes 44.

At this time, the second pitch of the female threaded portions 80 with which the threaded portions 66 of the blade tools 36 are screw-engaged is smaller than the first pitch of the inner circumferential threaded portions 54 with which the adjustment members 76 are screw-engaged. Therefore, when the adjustment members 76 are advanced at the first pitch in the axial direction along the inner circumferential threaded portions 54, the blade tools 36 are retracted at the second pitch in the axial direction along the female threaded portions 80 of the adjustment members 76. More specifically, the blade tools 36 are advanced in the axial direction by the difference between the first pitch and the second pitch.

The pressing mechanisms 40 are equipped with pressing members 84 and fastening bolts 86.

The pressing members 84 are formed by plate-shaped materials (leaf springs) possessing elasticity. The pressing members 84 have a rectangular shape corresponding to the concave portions 48 of the tool shafts 34. The pressing members 84 are accommodated in the concave portions 48. The pressing members 84 are fitted in the concave portions 48 in a widthwise direction thereof. Consequently, the pressing members 84 are positioned in the concave portions 48. The pressing members 84 abut against the retaining surfaces 60 of the concave portions 48. The pressing members 84 do not project out from the outer circumferential surfaces of the tool shafts 34 (refer to FIG. 4 and FIG. 5). Threaded holes 88 are included on upper parts of the pressing members 84. In the concave portions 48, the threaded holes 88 face toward the small diameter portions 56 of the bolt holes 46. The fastening bolts 86 that have been inserted through the bolt holes 46 are screw-engaged with the threaded holes 88.

Lower parts of the pressing members 84 face toward the first hole portions 50 of the insertion holes 44. The lower parts of the pressing members 84 abut against the pressed surfaces 74 of the grinding relief portions 68 of the blade tools 36 (refer to FIG. 4).

When viewed from the axial direction of the tool shafts 34 shown in FIG. 4, and when a line segment that is in parallel with the central axis of the blade tools 36 and that passes through the blade edges 72 is defined as an imaginary line L, it is desirable for the pressing members 84 to be disposed at positions that are spaced apart from the blade edges 72 with respect to the imaginary line L. Consequently, when the blade tools 36 are replaced due to chipping of the blade edges 72 or the like, it becomes possible to do away with the necessity of removing the pressing members 84. In other words, the blade tools 36 can be replaced with the pressing members 84 still installed thereon.

The fastening bolts 86 are inserted into the bolt holes 46 of the tool shafts 34. The fastening bolts 86 include head portions 90 and shaft portions 92. The head portions 90 are accommodated in the large diameter portions 58 of the bolt holes 46. The head portions 90 are exposed to the exterior through the large diameter portions 58. The shaft portions 92 are smaller in diameter than the head portions 90. The shaft portions 92 are connected to the head portions 90 and extend in the axial direction. The shaft portions 92 are inserted into the small diameter portions 56 of the bolt holes 46. The shaft portions 92 are equipped with threads on the outer circumferential surface thereof. Distal ends of the shaft portions 92 are screw-engaged with the threaded holes 88 of the pressing members 84 in the concave portions 48.

The head portions 90 of the fastening bolts 86 are capable of being rotated from the exterior of the tool shafts 34. When the fastening bolts 86 are rotated, the pressing members 84 that are screw-engaged with the shaft portions 92 move toward the retaining surfaces 60 in the concave portions 48. Accompanying the pressing members 84 moving toward the retaining surfaces 60, the pressing members 84 press the pressed surfaces 74 of the blade tools 36. The pressed surfaces 74 are pressed by the pressing members 84 along the direction of the central axis of the bolt holes 46 and the fastening bolts 86.

The blade tools 36 are pressed toward the proximal ends by the pressing members 84, and the proximal ends of the blade tools 36 are retained while being capable of moving on the tool shafts 34 by the adjustment members 76.

As shown in FIG. 1 and FIG. 2, the main body frame 14 is equipped with four jigs 94. The jigs 94 are capable of retaining the workpiece W. Each of the jigs 94 is retained to be capable of rotating by support carriers. When the support carriers are rotated, one jig 94 of the four jigs 94 faces toward a support block 96 and is retained by the support block 96.

The jigs 94 are equipped with jig main bodies 98 and first and second bearing portions 100 and 102. The first bearing portions 100 are disposed at upper ends of the jig main bodies 98. The second bearing portions 102 are disposed at lower ends of the jig main bodies 98.

When the tool shafts 34 are lowered together with the tool heads 28, the upper parts of the tool shafts 34 are inserted into bearings (not shown) of the first bearing portions 100. When the tool shafts 34 are lowered together with the tool heads 28, the lower ends of the tool shafts 34 are inserted into bearings (not shown) of the second bearing portions 102. Consequently, the tool shafts 34 are supported to be capable of rotating by the bearings of the first and second bearing portions 100 and 102.

As shown in FIG. 1, the transport mechanism 20 is disposed on an upper part of the foundation 12. The transport mechanism 20 is disposed outwardly in a radial direction of the main body frame 14. The transport mechanism 20 is equipped with a movable platform 104, a cylinder 106, a workpiece retaining body 108, a pallet 110, and a pallet retaining portion 112. The movable platform 104 is capable of moving along the foundation 12. The cylinder 106 biases the movable platform 104 in directions toward or away from the main body frame 14. The workpiece retaining body 108 is retained by the movable platform 104. The pallet retaining portion 112 is installed on an end part of the workpiece retaining body 108. The pallet retaining portion 112 is capable of retaining the workpiece W via the pallet 110.

Next, a description will be given concerning a case in which the positions of the blade tools 36 of the cutting tools 18 are adjusted with respect to the tool shafts 34.

Initially, when the projecting amount T (refer to FIG. 4) of the cutting edge parts 64 of the blade tools 36 from the outer circumferential surfaces of the tool shafts 34 is increased, the operator inserts a non-illustrated adjustment tool into the adjustment hole portions 82 of the adjustment members 76. By causing the adjustment tool to be rotated in a predetermined direction, the adjustment members 76 are rotated.

By the adjustment members 76 being rotated, the adjustment members 76 move along the central axis of the second hole portions 52 and toward the first hole portions 50. At this time, the amount of movement of the adjustment members 76 becomes an amount of movement corresponding to the first pitch, which is the thread pitch of the male threaded portions 78 and the inner circumferential threaded portions 54.

Since the rotation of the blade tools 36 inside the insertion holes 44 is prevented by the pressing members 84 having a predetermined angle, the blade tools 36 do not rotate even if the adjustment members 76 rotate. Therefore, accompanying the adjustment members 76 being rotated, the threaded portions 66 of the blade tools 36 and the adjustment members 76 rotate relative to each other. By the threaded portions 66 rotating relative to the adjustment members 76, the adjustment members 76 and the blade tools 36 are displaced relative to each other in the axial direction, in a direction in which the adjustment members 76 and the main body portions 62 of the blade tools 36 approach each other (a direction in which the threaded portions 66 are pulled inwardly into the adjustment members 76). At this time, the amount of relative movement of the blade tools 36 (the threaded portions 66) with respect to the adjustment members 76 becomes an amount of movement corresponding to the second pitch, which is the thread pitch of the female threaded portions 80 and the threaded portions 66. In this instance, the amount of movement of the adjustment members 76 inside the insertion holes 44 when the adjustment members 76 are made to rotate by the predetermined angle is defined as D1, and the amount of relative movement between the adjustment members 76 and the blade tools 36 accompanying the rotation of the adjustment members 76 is defined as D2. The amount of movement D in the axial direction of the blade tools 36 inside the insertion holes 44 is D1-D2.

Therefore, at a time when the adjustment members 76 are made to rotate and the adjustment members 76 are made to move toward the distal ends of the blade tools 36, it becomes possible for the blade tools 36 to be moved slightly toward the distal ends with respect to the adjustment members 76. At this time, the distal ends of the blade tools 36 move outwardly in the radial direction in opposition to the pressing force of the pressing members 84. More specifically, in a state in which a preload is applied to the blade tools 36 by the pressing members 84, the blade tools 36 can be made to move toward the distal ends without the occurrence of rattling. Consequently, by causing the adjustment members 76 to rotate, it becomes possible to easily and highly accurately adjust the projecting amount T of the cutting edge parts 64 in the blade tools 36.

At this time, by the pressing members 84 of the pressing mechanisms 40, the blade tools 36 are pressed in a direction inclined at a predetermined angle with the central axis of the blade tools 36 via the pressed surfaces 74 of the grinding relief portions 68. The main body portions 62 of the blade tools 36 are biased toward inner circumferential surfaces 441 of the first hole portions 50 in an opposite direction (the direction of the arrow B) to the direction of rotation of the tool shafts 34 with respect to the central axis of the blade tools 36. The outer circumferential surfaces of the main body portions 62 are pressed against the first hole portions 50 while contacting the inner circumferential surfaces 441.

In this manner, by the adjustment members 76 of the position adjustment mechanisms 38 being rotated, the blade tools 36 can be advanced along the central axis of the insertion holes 44, and the projecting amount T of the cutting edge parts 64 from the outer circumferential surfaces of the tool shafts 34 can be made larger. After the positional adjustment of the cutting edge parts 64 has been performed, the blade tools 36 are firmly pressed against and fixed to the inner circumferential surfaces 441 of the insertion holes 44 by the pressing members 84.

Next, at a time when the projecting amount T of the cutting edge parts 64 of the blade tools 36 from the outer circumferential surfaces of the tool shafts 34 is made smaller, the operator rotates the adjustment members 76 in an opposite direction to the aforementioned direction by means of the non-illustrated adjustment tool. Consequently, the adjustment members 76 rotate, and the adjustment members 76 move along the central axis of the second hole portions 52 and in a direction away from the first hole portions 50. At this time, the amount of movement of the adjustment members 76 becomes an amount of movement corresponding to the first pitch, which is the thread pitch of the male threaded portions 78 and the inner circumferential threaded portions 54.

Accompanying the rotation of the adjustment members 76, the threaded portions 66 of the blade tools 36 and the adjustment members 76 rotate relative to each other. By the threaded portions 66 rotating relative to the adjustment members 76, the adjustment members 76 and the blade tools 36 are displaced relative to each other, in a direction in which the adjustment members 76 and the main body portions 62 of the blade tools 36 separate away from each other along the central axis of the insertion holes 44. At this time, the amount of movement of the blade tools 36 (the threaded portions 66) becomes an amount of movement corresponding to the second pitch, which is the thread pitch of the female threaded portions 80 and the threaded portions 66. In other words, the movement distance of the blade tools 36 becomes shorter than the movement distance of the adjustment members 76.

Therefore, at a time when the adjustment members 76 are made to rotate and the adjustment members 76 are made to move toward the proximal ends of the blade tools 36, it becomes possible for the blade tools 36 to be moved slightly toward the proximal ends with respect to the adjustment members 76. More specifically, in a state in which a preload is applied to the blade tools 36 by the pressing members 84, the blade tools 36 can be made to move toward the proximal ends without the occurrence of rattling. Consequently, by causing the adjustment members 76 to rotate, it becomes possible to easily and highly accurately adjust the projecting amount T of the cutting edge parts 64 in the blade tools 36.

At this time, by the pressing members 84 of the pressing mechanisms 40, the blade tools 36 are pressed in a direction inclined at a predetermined angle with the central axis of the blade tools 36 via the pressed surfaces 74 of the grinding relief portions 68. The main body portions 62 of the blade tools 36 are biased toward the inner circumferential surfaces 441 of the first hole portions 50 in an opposite direction (the direction of the arrow B) to the direction of rotation of the tool shafts 34 with respect to the central axis of the blade tools 36. The outer circumferential surfaces of the main body portions 62 are pressed against the first hole portions 50 while contacting the inner circumferential surfaces 441.

In this manner, by the adjustment members 76 of the position adjustment mechanisms 38 being rotated, the blade tools 36 can be retracted along the central axis of the insertion holes 44, and the projecting amount T of the cutting edge parts 64 from the outer circumferential surfaces of the tool shafts 34 can be made smaller. After the positional adjustment of the cutting edge parts 64 has been performed, the blade tools 36 are firmly pressed against and fixed to the inner circumferential surfaces 441 of the insertion holes 44 by the pressing members 84.

Next, a description will be given concerning operations of the cutting machine 10 in which the cutting tools 18 are used.

First, at a position in which the movable platform 104 of the transport mechanism 20 is separated away from the main body frame 14, the workpiece W is retained on the pallet 110. The cylinder 106 is driven, and thereby causes the movable platform 104 to be moved toward the main body frame 14 together with the workpiece retaining body 108. The workpiece W is retained by the jig 94. The support block 96 is delivered out toward the jig 94 and the jig 94 is retained by the support block 96.

Next, a non-illustrated feed mechanism is driven, and thereby causes the drive mechanism 16 and the tool head 28 to be lowered toward the workpiece W. Consequently, the cutting tools 18 are lowered together with the tool head 28. The cutting tools 18 are inserted into the machined holes H of the workpiece W. The upper ends and lower ends of the tool shafts 34 are supported to be capable of rotating by the first and second bearing portions 100 and 102.

The workpiece W is caused to move slightly in the horizontal direction by the transport mechanism 20, and the axial centers of the machined holes H of the workpiece W and the axial lines P of the tool shafts 34 are made to coincide. The drive motor 26 is driven, and the tool shafts 34 are further lowered while being made to rotate. Consequently, the cutting tools 18 rotate together with the tool shafts 34. The inner circumferential surfaces of the machined holes H are subjected to cutting machining by the cutting edge parts 64 of the blade tools 36 in the plurality of cutting tools 18. The inner circumferential surfaces of the machined holes H in the workpiece W are machined to a desired inner circumferential diameter.

At this time, the pressed surfaces 74 of the blade tools 36 are pressed by the pressing members 84, and the blade tools 36 are biased toward the proximal ends, together with the main body portions 62 of the blade tools 36 being pressed against and fixed to the inner circumferential surfaces 441 of the insertion holes 44. Therefore, when the machined holes H of the workpiece W are subjected to machining by the blade tools 36, even if a reaction force from the workpiece W is applied to the cutting edge parts 64, rattling of the blade tools 36 due to such a reaction force is suitably suppressed. The machined holes H of the workpiece W are machined with high precision by the blade tools 36 that are firmly fixed to the tool shafts 34.

In the foregoing manner, according to the embodiment of the present invention, the blade tools 36, the position adjustment mechanisms 38, and the pressing mechanisms 40 are provided in the cutting tools 18 that are used in the cutting machine 10 for machining the workpiece W. The blade tools 36 are disposed to be capable of moving in the insertion holes 44 of the tool shafts 34. The position adjustment mechanisms 38 are capable of adjusting the position in the axial direction of the blade tools 36 with respect to the tool shafts 34. The pressing mechanisms 40 press the grinding relief portions 68 of the blade tools 36. The pressing mechanisms 40 bias the blade tools 36 toward the proximal ends of the blade tools 36. The pressing mechanisms 40 bias the blade tools 36 toward the inner circumferential surfaces 441 of the insertion holes 44.

By the blade tools 36 being made to move along the insertion holes 44 by the position adjustment mechanisms 38, the projecting amount T by which the cutting edge parts 64 of the blade tools 36 project outwardly in the radial direction from the outer circumferential surfaces of the tool shafts 34 can be adjusted. By the pressed surfaces 74 provided in the vicinity of the cutting edge parts 64 being pressed at a predetermined angle by the pressing members 84 which have a substantially leaf spring shape in the pressing mechanisms 40, the blade tools 36 can be pressed in a direction intersecting the central axis of the blade tools 36 and pushed against the inner circumferential surfaces 441 of the insertion holes 44 while being pressed toward the proximal ends from the vicinity of the cutting edge parts 64. In accordance with this feature, the blade tools 36 can be firmly fixed to the tool shafts 34. The pushing direction of the blade tools 36 is an opposite direction (the direction of the arrow B) to the direction of rotation of the tool shafts 34.

When the tool shafts 34 rotate and machining of the workpiece W is carried out by the blade tools 36, even if a reaction force from the workpiece W is applied to the cutting edge parts 64 of the blade tools 36, the blade tools 36 are prevented from rattling in the insertion holes 44. As a result, when machining of the workpiece W is carried out by the cutting tools 18, vibration of the blade tools 36 caused by contact with the workpiece W is suppressed. Therefore, the workpiece W can be machined with high precision by the blade tools 36.

Even when the tool shafts 34 are small in diameter, it is possible for the position adjustment mechanisms 38 to highly accurately adjust the projecting amount T by which the cutting edge parts 64 of the blade tools 36 project both outwardly in the radial direction and inwardly in the radial direction.

The grinding relief portions 68 of the blade tools 36 are stepped portions formed by cutting out parts of the main body portions 62, and the grinding relief portions 68 are disposed in the direction of rotation of the tool shafts 34 with respect to the cutting edge parts 64 of the blade tools 36, and include the pressed surfaces 74 that are inclined with respect to the central axis of the blade tools 36. By the pressing members 84 of the pressing mechanisms 40 abutting against and pressing the pressed surfaces 74, the blade tools 36 can be pressed in an opposite direction (the direction of the arrow B) to the direction of rotation of the tool shafts 34. The main body portions 62 of the blade tools 36 can be pressed against and fixed to the inner circumferential surfaces 441 of the insertion holes 44. Consequently, by utilizing the grinding relief portions 68 of the blade tools 36, and thereby pressing the pressed surfaces 74 of the grinding relief portions 68 by the pressing members 84, the blade tools 36 can be securely fixed to the insertion holes 44 of the tool shafts 34.

By employing the configuration in which the grinding relief portions 68 (the pressed surfaces 74) of the blade tools 36 serve as the pressed portions and the pressed portions can be applied with a preload by being pressed by the pressing members 84, the manufacturing cost of the cutting tools 18 can be reduced compared to a case in which a portion to be pressed by the pressing members 84 is newly provided.

By the grinding relief portions 68 that are in close proximity to the cutting edge parts 64 being pressed by the pressing members 84, the blade tools 36 can be firmly fixed to the tool shafts 34, thereby increasing the rigidity of the blade tools 36. Along therewith, vibration of the blade tools 36 when the workpiece W is subjected to machining by the blade tools 36 can be prevented.

The pressing mechanisms 40 include the pressing members 84 that press the pressed surfaces 74 of the grinding relief portions 68 of the blade tools 36, and the fastening bolts 86 that are inserted into the bolt holes 46 of the tool shafts 34. The shaft portions 92 of the fastening bolts 86 are screw-engaged with the threaded holes 88 of the pressing members 84. By causing the fastening bolts 86 to be rotated, and biasing the pressing members 84 toward the tool shafts 34 and the blade tools 36, the pressing members 84 can press the pressed surfaces 74 of the blade tools 36, and the blade tools 36 can be pressed against and firmly fixed to the inner circumferential surfaces 441 of the insertion holes 44. After the blade tools 36 have been positioned on the tool shafts 34, since there is no need to cause the fastening bolts 86 to be screw-rotated, the positions of the blade tools 36 can be maintained without the occurrence of a change in the posture thereof.

When viewed from the axial direction of the tool shafts 34, the pressing members 84 are disposed in a direction away from the cutting edge parts 64, with respect to the imaginary line L that is in parallel with the central axis of the blade tools 36 and that passes through the blade edges 72 of the cutting edge parts 64. In accordance with this feature, when the blade tools 36 are removed from the tool shafts 34 and replaced, and when the blade tools 36 are pulled out from the insertion holes 44 toward the direction of the second hole portions 52, the blade edges 72 (the cutting edge parts 64) of the blade tools 36 do not come into contact with the pressing members 84. Therefore, when the blade tools 36 are replaced, the replacement operation becomes capable of being performed without removing the pressing members 84. The same is true when new blade tools 36 are installed on the tool shafts 34.

More specifically, when the replacement operation of the blade tools 36 is carried out, the replacement operation becomes capable of being easily performed without removing the pressing members 84.

The position adjustment mechanisms 38 are equipped with the adjustment members 76. The adjustment members 76 include the male threaded portions 78 that are screw-engaged with the inner circumferential surfaces 441 of the insertion holes 44 of the tool shafts 34, and the female threaded portions 80 that are screw-engaged with the threaded portions 66 of the blade tools 36. The adjustment members 76 are disposed to be capable of rotating in the second hole portions 52 of the insertion holes 44. The thread pitch of the female threaded portions 80 is smaller than the thread pitch of the male threaded portions 78. Consequently, by the adjustment members 76 being rotated, the blade tools 36 that are screw-engaged with the adjustment members 76 are made to move along the axial direction, thereby making it possible to adjust the projecting amount T of the cutting edge parts 64 from the outer circumferential surfaces of the tool shafts 34. As noted previously, the thread pitch of the female threaded portions 80 is smaller than the thread pitch of the male threaded portions 78. Therefore, when the adjustment members 76 are rotated, the blade tools 36 can be made to move slightly in the axial direction.

As a result, the projecting amount T of the blade tools 36 from the outer circumferential surfaces of the tool shafts 34 can be adjusted highly accurately. A cutting tool of the conventional technique is provided with the two adjustment screws and fixing screws, and the adjustment operation is performed using the adjustment screws and the fixing screws. In contrast to this feature, in the present invention, by causing the adjustment members 76 to be rotated, it is possible to carry out the adjustment operation of the projecting amount T of the blade tools 36. Therefore, the number of steps required in order to adjust the projecting amount T of the blade tools 36 can be reduced.

The pressing members 84 are disposed along the axial direction of the tool shafts 34. The fastening bolts 86 are screw-engaged with upper parts of the pressing members 84 via the threaded holes 88. Lower parts of the pressing members 84 abut against the pressed surfaces 74 of the blade tools 36. In accordance with this feature, the pressing force exerted by the fastening bolts 86 on the upper parts of the pressing members 84 can be applied reliably toward the blade tools 36 at the lower parts of the pressing members 84. Therefore, the blade tools 36 can be biased toward the threaded portions 66 by the pressing members 84, and the main body portions 62 can be biased toward the inner circumferential surfaces 441 of the insertion holes 44 and thereby pressed against and fixed to the inner circumferential surfaces 441.

When viewed from the axial direction of the tool shafts 34, the fastening bolts 86 and the blade tools 36 are disposed so as to intersect with each other. Consequently, when the fastening bolts 86 are rotated and the pressing members 84 are made to move toward the blade tools 36, a pressing force can be applied from the pressing members 84 to the blade tools 36 in an inclined direction with respect to the central axis of the blade tools 36. Therefore, the pressing members 84 can reliably press the blade tools 36 against the inner circumferential surfaces 441 of the insertion holes 44, thereby making it possible to suppress rattling when the workpiece W is subjected to machining.

Figure 7:
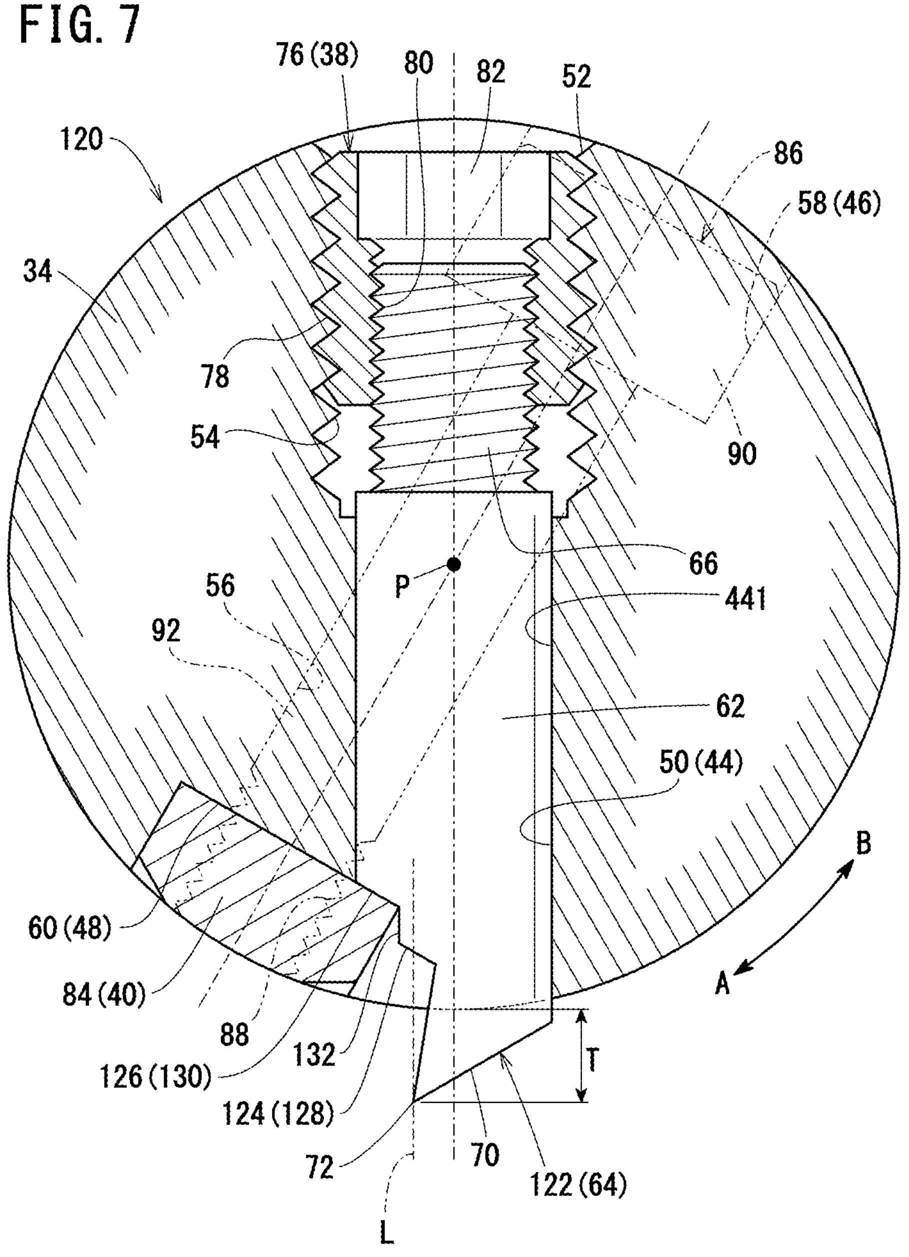
FIG. 7 is a cross-sectional view showing a cutting tool according to a first exemplary modification.

For example, cutting tools 120 according to a first exemplary modification shown in FIG. 7 may be adopted. The cutting tools 120 include blade tools 122. The blade tools 122 include first and second grinding relief portions 124 and 126. The first grinding relief portions 124 are disposed to be spaced apart from the cutting edge parts 64 toward the threaded portions 66. The second grinding relief portions 126 are disposed to be spaced apart from the first grinding relief portions 124 further toward the threaded portions 66.

The first and second grinding relief portions 124 and 126 have shapes that are cut out respectively from the distal ends of the blade tools 122 toward the main body portions 62. The first grinding relief portions 124 are adjacent to the cutting edge parts 64 and in close proximity to the central axis of the blade tools 122. The second grinding relief portions 126 are disposed closer to the outer circumferential surfaces of the blade tools 122 than the first grinding relief portions 124.

When the blade tools 122 are inserted into the insertion holes 44 of the tool shafts 34, the first and second grinding relief portions 124 and 126 are disposed in the direction of rotation (the direction of the arrow A) of the tool shafts 34 with respect to the cutting edge parts 64. The first grinding relief portions 124 and the second grinding relief portions 126 are formed in a stepped shape.

The first grinding relief portions 124 are provided with first pressed surfaces 128. The second grinding relief portions 126 are provided with second pressed surfaces 130. The first pressed surfaces 128 and the second pressed surfaces 130 are substantially parallel to each other. When the blade tools 122 are inserted into the insertion holes 44 of the tool shafts 34, the first and second pressed surfaces 128 and 130 are each orthogonal to the central axis of the bolt holes 46. The angle of inclination of the first and second pressed surfaces 128 and 130 with respect to the central axis of the blade tools 122 is the same as the angle of inclination of the retaining surfaces 60 of the concave portions 48 with respect to the central axis of the insertion holes 44 (refer to FIG. 7).

Engagement surfaces 132 are provided between the first pressed surfaces 128 and the second pressed surfaces 130. When viewed from the axial direction of the tool shafts 34, the engagement surfaces 132 are substantially parallel to the central axis of the blade tools 122. The engagement surfaces 132 connect the outer edges of the first pressed surfaces 128 and the inner edges of the second pressed surfaces 130.

When viewed from the axial direction of the tool shafts 34, and when a line segment that is in parallel with the central axis of the blade tools 122 and that passes through the blade edges 72 is defined as an imaginary line L, the second pressed surfaces 130 are disposed at positions that are spaced apart from the blade edges 72 with respect to the imaginary line L. The pressing members 84 that are accommodated in the concave portions 48 abut against the second pressed surfaces 130 of the second grinding relief portions 126. The pressing members 84 abut against the engagement surfaces 132.

In the cutting tools 120, when the pressing members 84 are placed in abutment against the second grinding relief portions 126 and the blade tools 122 are retained, the pressing members 84 abut against the second pressed surfaces 130, whereby the blade tools 122 can be biased toward the threaded portions 66, and further, can be biased toward the inner circumferential surfaces 441 of the insertion holes 44 and thereby fixed. By the pressing members 84 abutting against the engagement surfaces 132, the movement of the blade tools 122 in the direction of rotation (the direction of the arrow A) can be suppressed. Consequently, by retaining the second pressed surfaces 130 and the engagement surfaces 132 of the blade tools 122 with the pressing members 84, vibration of the blade tools 122 when the workpiece W is subjected to machining by the blade tools 122 can be more reliably suppressed.

When viewed from the axial direction of the tool shafts 34, and when a line segment that is in parallel with the central axis of the blade tools 122 and that passes through the blade edges 72 is defined as the imaginary line L, the pressing members 84 are disposed at positions that are spaced apart from the blade edges 72 with respect to the imaginary line L. Therefore, when the blade tools 122 are pulled out from the insertion holes 44 in the direction of the second hole portions 52, the pressing members 84 and the blade edges 72 do not come into contact with each other. Therefore, when the blade tools 122 are removed from the tool shafts 34 and replaced, the replacement operation of the blade tools 122 becomes possible without removing the pressing members 84.

Figure 8:
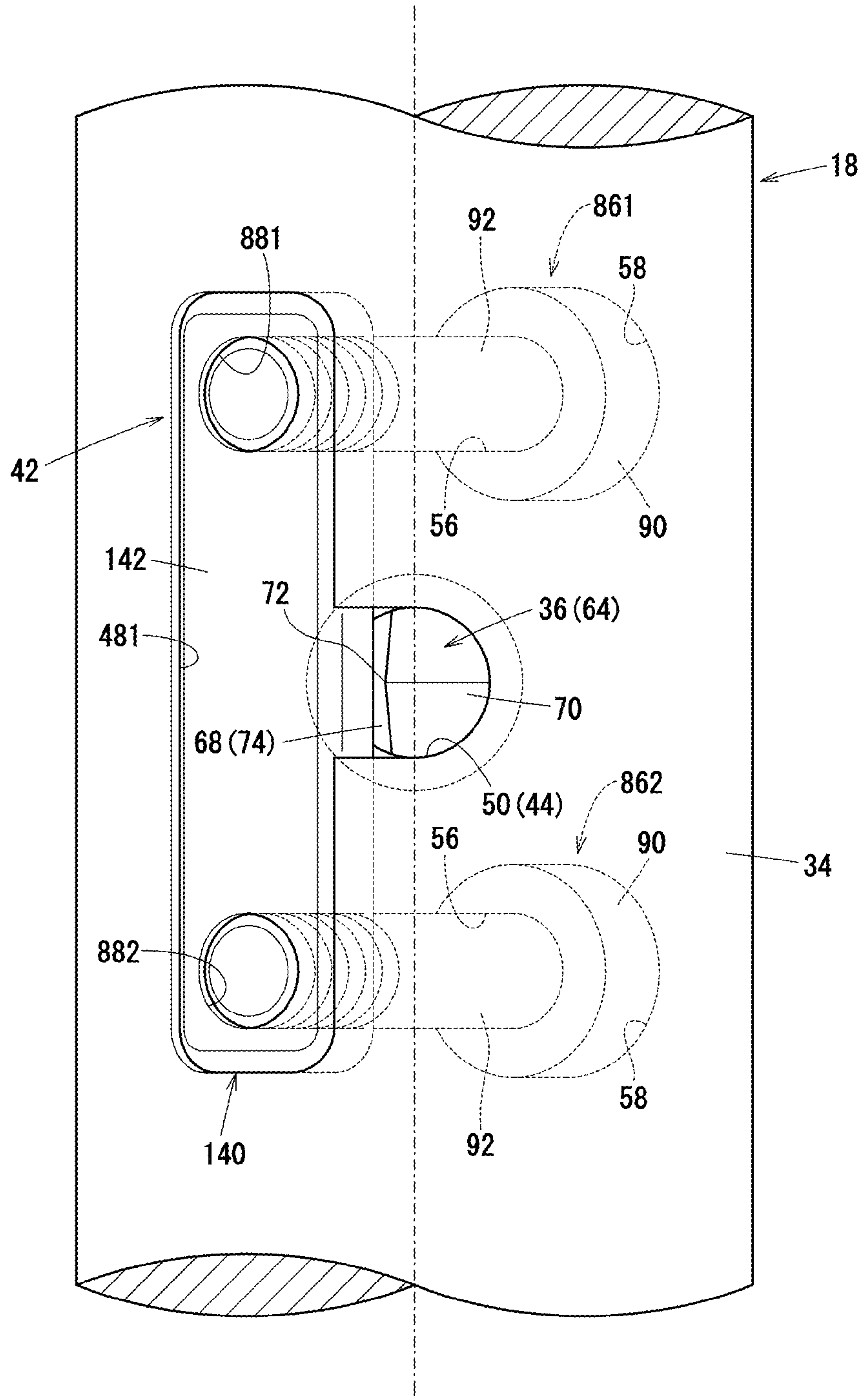
FIG. 8 is an enlarged front view showing a cutting tool according to a second exemplary modification.

Cutting tools 140 according to a second exemplary modification shown in FIG. 8 may be adopted. The cutting tools 140 include a pair of fastening bolts 861 and 862. The fastening bolts 861 and 862 are arranged to be spaced apart from each other in the axial direction of the tool shafts 34.

The fastening bolts 861 are arranged to be spaced apart from and above the blade tools 36. The fastening bolts 862 are arranged to be spaced apart from and below the blade tools 36. More specifically, the fastening bolts 861 and 862 are arranged so as to sandwich the blade tools 36 in the axial direction of the tool shafts 34. When viewed from the axial direction of the tool shafts 34, the fastening bolts 861 and 862 overlap one another.

The fastening bolts 861 and 862 are inserted respectively into the bolt holes 46 of the tool shafts 34.

The shaft portions 92 of the fastening bolts 861 and 862 are screw-engaged respectively with threaded holes 881 and 882 of pressing members 142. The pressing members 142 are accommodated in concave portions 481 of the tool shafts 34. Center portions of the pressing members 142 abut against the pressed surfaces 74 of the grinding relief portions 68 of the blade tools 36. In accordance with this feature, as compared to a case in which the pressing force exerted by the fastening bolts 861 and 862 on the upper parts and the lower parts of the pressing members 142 is applied by a single one of the fastening bolts 86, the pressing force can be applied more reliably toward the blade tools 36 at the center parts of the pressing members 142.

Therefore, the blade tools 36 are biased toward the threaded portions 66 via the pressing members 142 that are pressed against the pair of fastening bolts 861 and 862, and the main body portions 62 can be biased toward the inner circumferential surfaces 441 of the insertion holes 44 and thereby pressed against and more securely fixed to the inner circumferential surfaces 441.

The above-described embodiment can be summarized as follows.

The above-described embodiment is characterized by the cutting tool (18) that is used in the cutting machine (10) that machines the workpiece (W), the cutting tool comprising: the shaft (34) that is rotationally driven by the drive mechanism (16); the blade tool (36) that includes the distal end portion on which the cutting edge part (64) is formed, and the proximal end portion on the opposite side from the distal end portion, and that is inserted into the insertion hole (44) provided in the shaft in a manner so as to extend in a direction intersecting with the axial direction of the shaft, the blade tool being capable of moving in the hole axial direction of the insertion hole, wherein the cutting edge part is disposed to project outwardly in the radial direction from the outer circumferential surface of the shaft; the position adjustment mechanism (38) installed on the shaft, and capable of adjusting the position in the hole axial direction of the blade tool with respect to the shaft; and the pressing mechanism (40) which is installed on the shaft and which, by pressing the pressed portion (68) disposed between the cutting edge part and the proximal end portion of the blade tool, biases the blade tool toward the proximal end portion and biases the blade tool toward the inner surface of the insertion hole.

The pressed portion is a stepped portion formed by cutting out a portion of the blade tool, the stepped portion includes the inclined surface (74) that is disposed to be inclined with respect to the central axial line of the blade tool in the direction of rotation of the shaft with respect to the cutting edge part, and the pressing mechanism abuts against the inclined surface.

The pressing mechanism includes: the pressing member (84) that presses the pressed portion of the blade tool; and the fastening bolt (86) that is inserted through the shaft and screw-engaged with the pressing member, and that biases the pressing member toward the shaft and the blade tool.

The pressing mechanism includes: the pressing member that is arranged substantially in parallel with the inclined surface of the pressed portion, and that presses the inclined surface; and the fastening bolt that is inserted through the shaft and is screw-engaged with the pressing member, and that biases the pressing member toward the shaft and the blade tool.

When viewed from the axial direction of the shaft, the pressing member is disposed in a direction away from the cutting edge part, with respect to the line segment (L) that is in parallel with the central axial line of the blade tool and that passes through the blade edge (72) of the cutting edge part.

The position adjustment mechanism is equipped with the adjustment member (76) including the male threaded portion (78) that is screw-engaged with the inner surface of the insertion hole, and the female threaded portion (80) that is screw-engaged with the blade tool; the adjustment member is disposed to be capable of rotating on the inner portion of the insertion hole; and the thread pitch of the female threaded portion is smaller than the thread pitch of the male threaded portion.

The pressing member is disposed along the axial direction of the shaft; and one end of the pressing member along the axial direction is screw-engaged with the fastening bolt, and the other end of the pressing member along the axial direction abuts against the blade tool.

When viewed from the axial direction of the shaft, the fastening bolt and the blade tool intersect with each other.

The fastening bolt is provided as a pair sandwiching the blade tool in the axial direction of the shaft.

The pressed portion includes: the first pressed surface that is in close proximity to the cutting edge part; and the second pressed surface that is disposed closer to the proximal end portion than the first pressed surface is, and is disposed outwardly in the radial direction of the blade tool with respect to the first pressed surface, and the second pressed surface is pressed by the pressing mechanism.

Moreover, the present invention is not limited to the above-described embodiment, and various configurations can be adopted therein without departing from the essence and gist of the present invention.

REFERENCE SIGNS LIST

10: cutting machine
16: drive mechanism
18, 120, 140: cutting tool
34: tool shaft
36, 122: blade tool
38: position adjustment mechanism
40: pressing mechanism
44: insertion hole
46: bolt hole
64: cutting edge part
66: threaded portions
68: grinding relief portion
76: adjustment member
84, 142: pressing member
86, 861, 862: fastening bolt
132: engagement surface

What is claimed is:

1. A cutting tool that is used in a cutting machine configured to machine a workpiece, the cutting tool comprising:

a shaft configured to be rotationally driven by a drive mechanism;

a blade tool including a distal end portion on which a cutting edge part is formed, and a proximal end portion on an opposite side from the distal end portion, the blade tool being configured to be inserted into an insertion hole provided in the shaft in a manner so as to extend in a direction intersecting with an axial direction of the shaft, and the blade tool being movable in a hole axial direction of the insertion hole, wherein the cutting edge part is disposed to project outwardly in a radial direction from an outer circumferential surface of the shaft;

a position adjustment mechanism installed on the shaft and configured to adjust a position in the hole axial direction of the blade tool with respect to the shaft; and a pressing mechanism installed on the shaft and configured to, by pressing a pressed portion disposed between the cutting edge part and the proximal end portion of the blade tool, bias the blade tool toward the proximal end portion and bias the blade tool toward an inner surface of the insertion hole, wherein the pressing mechanism includes:

a pressing member configured to press the pressed portion of the blade tool; and a fastening bolt configured to be inserted through the shaft and screw-engaged with the pressing member, and to bias the pressing member toward the shaft and the blade tool, and when viewed from the axial direction of the shaft, the pressing member is disposed in a direction away from the cutting edge part, with respect to a line segment that is in parallel with a central axial line of the blade tool and that passes through a blade edge of the cutting edge part.

2. The cutting tool according to claim 1, wherein the pressed portion is a stepped portion formed by cutting out a portion of the blade tool, the stepped portion includes an inclined surface that is disposed to be inclined with respect to a central axial line of the blade tool in a direction of rotation of the shaft with respect to the cutting edge part, and the pressing mechanism abuts against the inclined surface.

3. The cutting tool according to claim 1, wherein the position adjustment mechanism includes an adjustment member including: a male threaded portion screw-engaged with the inner surface of the insertion hole; and a female threaded portion screw-engaged with the blade tool, the adjustment member is rotatably disposed on an inner portion of the insertion hole, and a thread pitch of the female threaded portion is smaller than a thread pitch of the male threaded portion.

4. The cutting tool according to claim 1, wherein the pressing member is disposed along the axial direction of the shaft, and one end of the pressing member along the axial direction is screw-engaged with the fastening bolt, and another end of the pressing member along the axial direction abuts against the blade tool.

5. The cutting tool according to claim 1, wherein when viewed from the axial direction of the shaft, the fastening bolt and the blade tool intersect with each other.

6. The cutting tool according to claim 1, wherein the fastening bolt is provided as a pair sandwiching the blade tool in the axial direction of the shaft.

7. The cutting tool according to claim 1, wherein the pressed portion includes:

a first pressed surface that is in close proximity to the cutting edge part; and a second pressed surface that is disposed closer to the proximal end portion than the first pressed surface is, and is disposed outwardly in the radial direction of the blade tool with respect to the first pressed surface, and the second pressed surface is pressed by the pressing mechanism.

* * * * *